No. 821,703. PATENTED MAY 29, 1906.
R. CONRAD.
BALL BEARING.
APPLICATION FILED MAY 12, 1904.
*Fig. 1.*
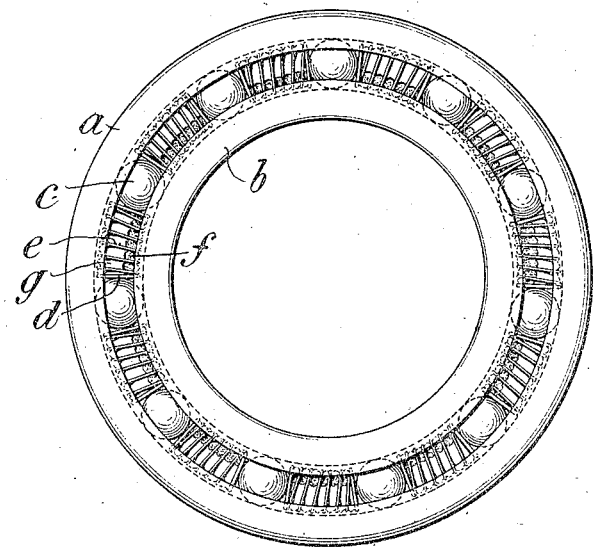
*Fig. 3.* *Fig. 2.* *Fig. 5.* *Fig. 7.*
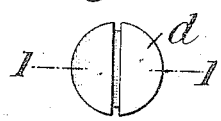 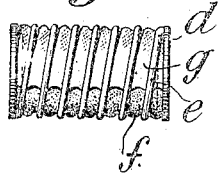 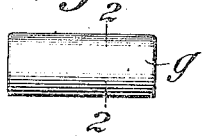 
*Fig. 4.* *Fig. 6.*
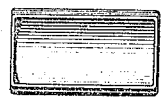
*Fig. 8.* *Fig. 10.* *Fig. 11.* *Fig. 13.*
   
 *Fig. 9.* 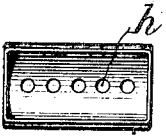 *Fig. 12.*
WITNESSES: INVENTOR
Fred White Robert Conrad,
Rene Bruine By his Attorneys
Arthur E. Fraser & Co

UNITED STATES PATENT OFFICE.

ROBERT CONRAD, OF BERLIN, GERMANY.

BALL-BEARING.

No. 821,703.    Specification of Letters Patent.    Patented May 29, 1906.

Application filed May 12, 1904. Serial No. 207,598.

*To all whom it may concern:*

Be it known that I, ROBERT CONRAD, engineer, a subject of the German Emperor, residing at 248 Kurfürstendam, Berlin, in the Empire of Germany, have invented certain new and useful Improvements in Ball-Bearings, of which the following is a specification, reference being had to the drawings hereunto annexed and to the letters marked thereon.

The invention relates to that class of ball-bearings which are provided with partition devices or "cages" placed between the balls, said partition devices or cages being adapted to act as vessels or receptacles for lubricating matter by the insertion therein of a material capable of absorbing oil—such, for example, as are shown and claimed in my application, Serial No. 220,653, filed August 13, 1904. The object of said arrangement is to prevent the wearing out of the parts between the cages or partition devices and the running-surface and also between said partition devices or cages and the balls. Said partition devices or cages adapted as oil or grease retainers may serve either for permanently lubricating the bearings or they may only be used as spare lubricators in case of any obstruction or when the ordinary method of lubricating fails altogether.

The present invention has for its object to further improve this new method—namely, by the production of suitable types of such partition devices or cages capable of absorbing or holding and giving out oil or fatty substances. In this respect, first of all, an important improvement has been devised whereby felt or material similar to felt is used to retain the oil or grease. The arrangement, based on the use of this felt material, may be such that the latter is either employed alone without any protection for use as partition devices adapted as oil-retainers or the said pieces or sections of felt may be protected by wire or any other suitable material, when both the pieces or sections of felt and their protecting material together form the partition devices or the elements of the cages or oil-retainers. In the latter case the oil-retainer thus formed by the combination of felt and the protecting material may be employed either with or without end plates adjacent to the balls.

In the accompanying drawings, Figure 1 is a side view of part of a ball-bearing having the present invention applied thereto. Fig. 2 is a side view of one of the partition devices separately. Fig. 3 is a face view of one of the end plates thereof. Fig. 4 is a horizontal section taken on the line 1 1 of Fig. 3. Fig. 5 is a side view of the trough-shaped body separately. Fig. 6 is an under side view thereof. Fig. 7 is a transverse section taken on the line 2 2 of Fig. 5. Fig. 8 is a side view of a modified trough or body. Fig. 9 is an under side view thereof. Fig. 10 is a transverse section taken on the line 3 3 of Fig. 8. Fig. 11 is a side view of a trough or body, illustrating a further modification. Fig. 12 is an under side view thereof, and Fig. 13 is a transverse section taken on the line 4 4 of Fig. 11.

The drawings illustrate a device constructed according to the present invention wherein the pieces or sections of felt or like material capable of retaining oil are arranged in combination with the protecting material and end plates.

Fig. 1 represents part of a ball-bearing and illustrates the application thereto of the partition devices containing oil or grease or of the elements of the "cage," made of felt or the like material, between the balls of the bearing. The ball-bearing itself according to this example of the invention is formed by an inner ring $b$, an outer ring $a$, and by the balls $c$, the bearing being, according to the method of employing it, either a supporting means or a running device. In the case here illustrated by way of example the devices $f$, consisting of felt or other similar material, are inserted into a wire coil or helical spring $e$, which at each of its extremities carries an end plate $d$. Between the piece or section of felt $f$ and the protecting coil or spring $e$ is placed an inverted-trough-shaped body $g\ g'\ g^2$, composed of material impermeable or almost impermeable to oil. Said trough being inverted is more or less open at its bottom, so that after the intermediate pieces or sections of felt are inserted they are covered upon the upper or outer running-surface, but are more or less uncovered toward the bottom or inner running-surface. This arrangement is made for the purpose of, on the one hand, preventing the oil of the felt from being thrown off by centrifugal force and, on the other hand, of permitting the felt or the like material to soak up oil.

The trough-shaped body $g$ (shown in Figs. 1 to 7) is considerably open at its bottom, so that the piece or section of felt of the inner running-surface provides a correspondingly large surface for soaking up the oil.

Figs. 8 to 10 represent a trough $g'$, which is almost closed, so that the lower aperture forms a somewhat narrow slot, showing only a small part of the felt free to soak up the oil. Generally speaking, it is always advisable to cover the felt with the trough-shaped body at least around half its circumference. In certain cases, however, one or more apertures $h$ of small diameter may be provided at the upper part of the trough $g^2$ in order to permit oil to pass through the top, as shown at Figs. 11 to 13. The material of the bodies $g\ g'\ g^2$ may be of any suitable kind—as, for instance, sheet-zinc, celluloid, woven fabric, or the like. In some cases textile material varnished or rendered oil-proof, vegetable fibers, paper, and the like can also be employed. The bearing may be assembled by means of filling-recesses provided in the side of one of the rings or by an eccentric disposition of the rings, as described in my application, Serial No. 194,894, filed February 23, 1904, or in any other suitable way. The absorbent material may be readily compressed sufficiently to introduce it into the protectors $g$ and $g^2$. The protectors $g'$ must be formed about the absorbent material or must be flexible, so that they may be distorted to introduce the absorbent material through the normally narrow slit provided. If the speed or number of revolutions are not very great, the bodies $g$ may be dispensed with.

The present patent is limited to the invention of the protectors described, the compressible lubricating devices being claimed in my application Serial No. 220,653, above referred to.

Having now particularly described and ascertained the nature of the said invention and in what manner the same is to be performed, I declare that what I claim is—

1. A ball-bearing including in combination balls and separating devices between said balls, the intermediate portions of said ball-separating devices being of material capable of absorbing and gradually releasing a lubricant, said intermediate portions being combined with protectors, and with end plates separating the same from the balls.

2. A ball-bearing including in combination balls and separating devices between said balls, the intermediate portions of said ball-separating devices being of material capable of absorbing and gradually releasing a lubricant, said intermediate portions being combined with protectors for their outer parts consisting essentially of inverted troughs approximately oil-proof at the outer side to prevent the oil being thrown off by centrifugal force, and open at the inner side to permit absorption of oil.

ROBERT CONRAD.

Witnesses:
 HENRY HASPER,
 WOLDEMAR HAUPT.